(12) United States Patent
Ligenza et al.

(10) Patent No.: US 10,535,171 B2
(45) Date of Patent: *Jan. 14, 2020

(54) EVALUATION MANAGER FOR 3D ANIMATION SCENES

(71) Applicant: AUTODESK, INC., San Rafael, CA (US)

(72) Inventors: Krystian Ligenza, Montreal (CA); Kevin Picott, Oakville (CA)

(73) Assignee: AUTODESK, INC., San Rafael, CA (US)

(*) Notice: Subject to any disclaimer, the term of this patent is extended or adjusted under 35 U.S.C. 154(b) by 7 days.

This patent is subject to a terminal disclaimer.

(21) Appl. No.: 16/017,930

(22) Filed: Jun. 25, 2018

(65) Prior Publication Data

US 2018/0300924 A1 Oct. 18, 2018

Related U.S. Application Data

(63) Continuation of application No. 15/091,512, filed on Apr. 5, 2016, now Pat. No. 10,008,019.

(60) Provisional application No. 62/148,109, filed on Apr. 15, 2015.

(51) Int. Cl.
*G06T 15/00* (2011.01)
*G06T 11/20* (2006.01)
*G06T 13/20* (2011.01)

(52) U.S. Cl.
CPC .......... *G06T 13/20* (2013.01); *G06T 2210/61* (2013.01); *G06T 2213/12* (2013.01)

(58) Field of Classification Search
CPC .. G06T 13/20; G06T 2210/61; G06T 2213/12
See application file for complete search history.

(56) References Cited

U.S. PATENT DOCUMENTS

| | | | |
|---|---|---|---|
| 5,808,625 A | 9/1998 | Picott et al. | |
| 5,929,864 A | 7/1999 | Picott et al. | |
| 2006/0274070 A1* | 12/2006 | Herman | A63F 13/10 345/474 |
| 2010/0123723 A1 | 5/2010 | Collard et al. | |
| 2013/0194279 A1 | 8/2013 | Watt et al. | |
| 2014/0035922 A1 | 2/2014 | Watt et al. | |
| 2014/0035931 A1* | 2/2014 | Powell | G06T 13/20 345/473 |
| 2014/0253561 A1 | 9/2014 | Marvie et al. | |

(Continued)

*Primary Examiner* — Martin Mushambo
(74) *Attorney, Agent, or Firm* — Artegis Law Group, LLP

(57) ABSTRACT

One embodiment of the invention disclosed herein provides techniques for processing an evaluation graph associated with a three-dimensional animation scene. An evaluation management system retrieves a first plurality of nodes from a memory. The evaluation management system determines that a first node included in the first plurality of nodes depends on a first output generated by a second node that also is included in the first plurality of nodes. The evaluation management system generates a third node corresponding to the first node and a fourth node corresponding to the second node. The evaluation management system generates an evaluation graph that includes the third node, the fourth node, and an indication that the third node depends on the fourth node. The evaluation management system schedules the third node for evaluation after the fourth node has been evaluated.

22 Claims, 10 Drawing Sheets

(56) References Cited

U.S. PATENT DOCUMENTS

2014/0267277 A1\* 9/2014 McNerney .............. G06T 13/20
                                                                  345/426
2014/0267288 A1   9/2014 Smyth
2014/0267352 A1   9/2014 Smyth
2017/0084061 A1   3/2017 Papp et al.

\* cited by examiner

EVALUATION MANAGER FOR 3D ANIMATION SCENES

CROSS-REFERENCE TO RELATED APPLICATIONS

This application is a continuation of the co-pending U.S. patent application titled, "EVALUATION MANAGER FOR 3D ANIMATION SCENES," filed on Apr. 5, 2016 and having Ser. No. 15/091,512, which claims the priority benefit of U.S. provisional patent application titled, "EVALUATION MANAGER FOR 3D ANIMATION SCENES," filed on Apr. 15, 2015 and having Ser. No. 62/148,109. The subject matter of these related applications is hereby incorporated herein by reference.

BACKGROUND OF THE INVENTION

Field of the Invention

Embodiments of the present invention relate generally to three-dimensional (3D) computer animation and, more specifically, to an evaluation manager for 3D animation scenes.

Description of the Related Art

In the field of computer animation, the objects in 3D scenes are typically represented by a directed graph commonly referred to a dependency graph. The dependency graph, also referred to as a scene graph, includes nodes, where each node includes inputs, outputs, and attributes. Typically, a single dependency graph represents the entire 3D scene, where the nodes of the dependency graph represent 3D geometry objects, animation information, light sources, textures, expressions, and so on. Certain nodes in a dependency graph represents a location, such as a joint or muscle, on an object or character in an animation, whose movement can be controlled. During each time step of the animation, one or more controllers apply forces to the various nodes, causing the associated joints or muscles to move in response. Among other things, the dependency graph identifies the relationships among the different nodes, and, more specifically, defines how specific nodes move in response to particular movements effected at a given related node. For example, a controller could apply a twisting force to a node corresponding to the hips of a particular object. The dependency graph would identify related nodes that also move when the hips of the object receive the twisting force. That is, the dependency graph would specify how other nodes, corresponding to the legs, arms, upper body, and head of the object, move when a twisting force is applied to the hip node.

After all nodes in the dependency graph are evaluated for a particular time step, the time advances to the next time step. The nodes in the dependency graph are again evaluated based on the forces applied to various nodes at the new time step. By applying forces to the different nodes at each time step and evaluating the nodes within the dependency graph at each time step based on those forces, the locations of each node in the dependency graph are computed over time. As the different nodes "move" to those locations over time, the various objects in the 3D scene are "animated" and appear to move within the 3D scene. In addition to advancing the time step, other changes can cause nodes of the dependency graph to be evaluated. For example, changing the rotation value of a joint on an animated character causes the node representing that joint to be evaluated, along with other nodes that are dependent on the node representing the joint.

One drawback of using dependency graphs to animate objects in a 3D scene is that, in general, each node of the dependency graph is evaluated completely at each time step. However, some objects in the 3D scene may not move as time advances from one time step to the next time step because either the objects are static and do not move, or the objects are simply not in motion at particular time steps. As a result, processing resources are unnecessarily consumed when nodes that do not move between time steps are evaluated. Another drawback of using dependency graphs is that identifying node subsets within the dependency graph to evaluate in parallel is generally difficult. Consequently, most nodes within dependency graphs are evaluated in a serial, single-threaded fashion, which results in longer evaluation times when animating objects in a 3D scene.

As the foregoing illustrates, what is needed are more effective ways to animate objects in a 3D scene.

SUMMARY OF THE INVENTION

One embodiment of the present application sets forth a method for processing an evaluation graph associated with a three-dimensional animation scene. The method includes retrieving a first plurality of nodes from a memory. The method further includes determining that a first node included in the first plurality of nodes depends on a first output generated by a second node that also is included in the first plurality of nodes. The method further includes generating a third node corresponding to the first node and a fourth node corresponding to the second node. The method further includes generating an evaluation graph that includes the third node, the fourth node, and an indication that the third node depends on the fourth node. The method further includes scheduling the third node for evaluation after the fourth node has been evaluated.

Other embodiments of the present invention include, without limitation, a computer-readable medium including instructions for performing one or more aspects of the disclosed techniques, as well as a computing device for performing one or more aspects of the disclosed techniques.

At least one advantage of the disclosed techniques is that nodes in a dependency graph are evaluated in parallel at a finer granularity relative to prior approaches. As a result, the time needed to evaluate independent nodes may be reduced, when scheduled on a multithreaded system, leading to faster and more interactive playback and manipulation of animated objects in a 3D scene.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that embodiments of the present invention may be practiced without one or more of these specific details.

Hardware Overview

Figure 1:
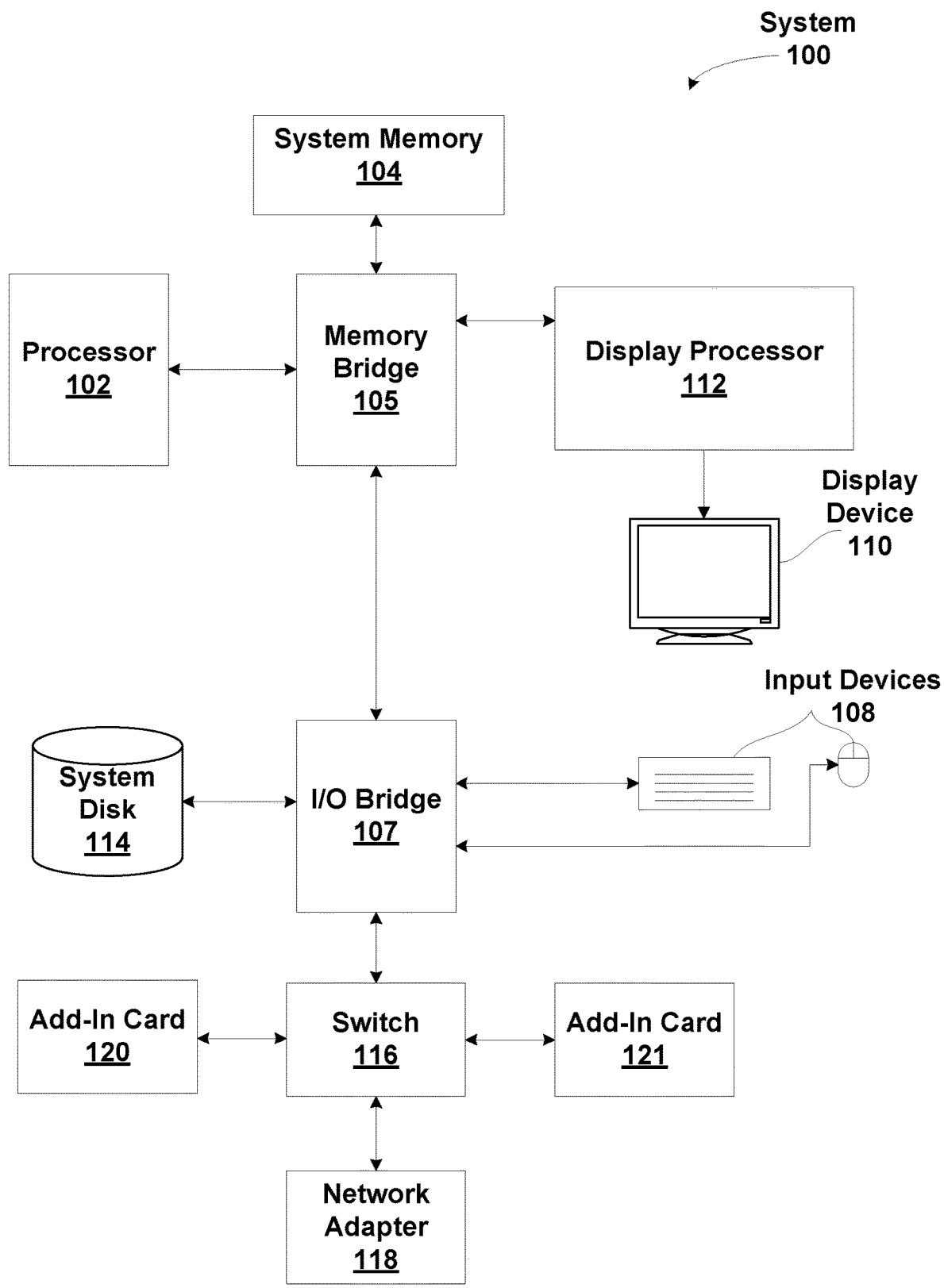
FIG. 1 illustrates a computing system configured to implement one or more aspects of the present invention.

FIG. 1 illustrates a computing system 100 configured to implement one or more aspects of the present invention. This figure in no way limits or is intended to limit the scope of the present invention. Computing system 100 may be a personal computer, video game console, personal digital assistant, mobile phone, mobile device, or any other device suitable for implementing one or more aspects of the present invention.

As shown, computing system 100 includes, without limitation, a processor 102, display processor 112, input/output (I/O) bridge 107, and system memory 104, coupled together and communicating via a bus path that may include a memory bridge 105. Processor 102 may be any technically feasible form of processing device configured to process data and execute program code. Processor 112 could be, for example, a central processing unit (CPU), a graphics processing unit (GPU), an application-specific integrated circuit (ASIC), a field-programmable gate array (FPGA), and so forth. Likewise, display processor 112 may be any technically feasible form of processing device configured to process data and execute program code. Display processor 112 could be, for example, a central processing unit (CPU), a graphics processing unit (GPU), an application-specific integrated circuit (ASIC), a field-programmable gate array (FPGA), and so forth.

Processor 102 and display processor 112 include one or more processing cores. In operation, one or both of processor 102 and display processor 112 is the master processor of computing system 100, controlling and coordinating operations of other system components. System memory 104 stores software applications and data for use by processor 102. Either or both of processor 102 and display processor 112 execute software applications stored within system memory 104 and optionally an operating system. In particular, either or both of processor 102 and display processor 112 executes software and then performs one or more of the functions and operations set forth in the present application. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to processor 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by processor 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows computing system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by processor 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, processor 102, and I/O bridge 107 to form a system on chip (SoC). In still further embodiments, display processor 112 is omitted and software executed by processor 102 performs the functions of display processor 112.

Pixel data can be provided to display processor 112 directly from processor 102. In some embodiments of the present invention, instructions and/or data representing a scene are provided to a render farm or a set of server computers, each similar to computing system 100, via network adapter 118 or system disk 114. The render farm generates one or more rendered images of the scene using the provided instructions and/or data. These rendered images may be stored on computer-readable media in a digital format and optionally returned to computing system 100 for display. Similarly, stereo image pairs processed by display processor 112 may be output to other systems for display, stored in system disk 114, or stored on computer-readable media in a digital format.

Alternatively, processor 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

Processor 102, render farm, and/or display processor 112 can employ any surface or volume rendering technique known in the art to generate one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to processor 102 directly rather than through a bridge, and other devices communicate with system memory 104 via memory bridge 105 and processor 102. In other alternative topologies display processor 112 is connected to I/O bridge 107 or directly to processor 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107. In addition, in some embodiments, two or more computing systems, such as computing system 100, may communicate with one another via a network (not explicitly shown) to form a distributed computing system. In such embodiments, two or more computing systems execute software and then perform one or more of the functions and operations set forth in the present application.

Evaluation Management System for 3D Animation Scenes

Among other things, embodiments of the present invention are directed towards an approach for generating evaluation graphs based on underling dependency graphs associated with certain software applications, such as the Maya® 3D animation from Autodesk®, Inc., modeling, simulation, and rendering software application. Embodiments of the present invention are further directed towards an approach for scheduling and evaluating the nodes included in such evaluation graphs. Each evaluation graph is a directed graph that includes a collection of entities connected together, where the connections allow data to move from one entity in the evaluation graph to another entity. As contrasted with a directed acyclic graph (DAG), an evaluation graph may include cyclic connections. The evaluation graph includes nodes, referred to herein as evaluation graph nodes, where such nodes are employed for various operations, including, without limitation, model creation, deformation, animation, simulation, and audio processing. A connection between two nodes indicates that one of the two nodes has a dependency on an attribute or other data that resides within the other node. The evaluation graph is effectively an overlay on top of an underlying dependency graph, as now described.

When an attribute of a node is changed, the dependency graph is processed to determine whether that attribute affects any output attribute. If the changed attribute affects one or more output attributes, then each of those output attributes is marked dirty, meaning that the associated cached value is stale and needs to be reevaluated. For each of the output attributes marked as dirty, the dependency graph checks to see if the output attribute is a source for a connection. If so, then the connection is followed, and the destination attribute is marked dirty also. This process recurs until all attributes of nodes in the dependency graph which need to be recomputed are marked as dirty. Subsequently, certain events, such as a screen refresh or an animation playback, cause one or more nodes in the dependency graph to be reset and reevaluated, based on the nodes that have been marked as dirty. In general, data that is not valid is considered as dirty, otherwise the data is considered clean. For example, if the current time step changes, all nodes that represent an object that is animated are considered dirty, because the data within such nodes contains values that are valid for the previous time step. After these nodes are evaluated for the current time step, the nodes are marked as clean.

Under prior approaches, dirty propagation caused large portions of the dependency graph to be marked as dirty, resulting in re-evaluation of a large number of nodes on a relatively frequent basis. These prior approaches also suffered from an inability to effectively determine which portions of the dependency graph are independent and, therefore, would benefit from parallel execution on a multithreaded processor. For dependency graphs that include cycles, prior approaches resolved cycles at the node level at evaluation time, leading to inconsistent results depending on which node in the cycle is selected to begin evaluation.

With the approaches described herein, an evaluation manager, also referred to herein as an evaluation management system, employs an innovative evaluation approach to generate a new form of dependency graph, referred to herein as an evaluation graph. This new evaluation approach begins when one or more nodes are marked as dirty, thereby invalidating the current evaluation graph representing the current topology. Typically, one or more nodes are marked as dirty when the evaluation identifier (ID) changes, signifying that the time stamp has changed, or that some other condition has caused one or more nodes to be marked as dirty. As a result, nodes that are animated between the current time stamp/evaluation ID and the new time stamp/evaluation ID are marked as dirty. Marking such nodes as dirty reflects that the position and/or other attributes of such nodes may change when transitioning from the current time stamp/evaluation ID to the new time stamp/evaluation ID. Events other than a change in time step can also change the evaluation ID and invalidate the current evaluation graph, thereby stimulating the reevaluation of the nodes in the evaluation graph. These events include, without limitation, a change in one or more values residing in one or more nodes, an instruction in an application program that marks one or more nodes as dirty, and a script program that marks one or more nodes as dirty. When one or more nodes are marked as dirty, the entire current evaluation graph is invalidated. Once the current evaluation graph is invalidated, a new evaluation is requested. This condition triggers a new evaluation, where the nodes of the evaluation graph with an out of date evaluation ID are marked as dirty and reevaluated.

The evaluation management system also maintains a topology identifier (ID) that changes when the structure, or topology, of the underlying dependency graph changes, such as when a node is added or removed, or a connection between nodes is made or broken. In such a condition, the topology ID changes, causing the topology of the evaluation graph to be invalidated. This condition doesn't trigger dirty status or evaluation, but rather triggers the rebuilding of a new evaluation graph representing the new topology. A new evaluation graph representing the new topology is constructed, corresponding to the new topology ID. During construction of the new evaluation graph, if a particular node is part of the new topology, the node is reset. Resetting the node removes all upstream and downstream dependencies associated with the node. Removing all dependencies prepares the node for connection to the new topology. The dirty messages associated with the node are processed in order to reconnect the node to upstream and/or downstream nodes, based on the new topology. These upstream and downstream nodes are also reset and reconnected to the new topology. The reset/reconnect process continues until there are no remaining nodes marked as dirty that are also part of the new topology. Any remaining nodes are not part of the new topology, and, therefore, are not accessed during the construction of the new evaluation graph. Once the new evaluation graph, corresponding to the new topology, is built, the active nodes are marked as dirty to stimulate an initial evaluation of the nodes in the new evaluation grap.

The evaluation graph is then transformed into a scheduling graph, whereby the nodes in the scheduling graph are scheduled for serial evaluation, parallel evaluation, or a combination of serial and parallel evaluation. Evaluation of the nodes in the new evaluation graph involves computing new attribute values based on the new evaluation ID and the dependencies represented by the new evaluation graph. Evaluation may proceed via any technically feasible approach including, without limitation, forward evaluation and push/pull evaluation. Forward evaluation is a technique for evaluating an evaluation graph, where the evaluation progresses through the evaluation graph by starting from the leaf source nodes, evaluating the leaf source nodes, and pushing the results to the corresponding destinations. By contrast, push/pull Evaluation, also referred to as reverse evaluation, is a two-phase technique for evaluation. In the first phase, referred to as the push phase, dirty state information is propagated forward through the evaluation graph to tag the values that are out of date. In the second phase, referred to as the pull phase, a particular output value is requested causing the corresponding node to retrieve the inputs needed to compute the output. The nodes associated with the needed inputs, in turn, pull on other nodes of the evaluation graph to retrieve further inputs needed by the other nodes, and so on. This process continues through the graph as needed in order to fully evaluate the originally requested output value. In some embodiments, the push phase may not capable of being performed when the evaluation management system is active because propagation of dirty messages is disabled. In these embodiments, the evaluation management system may identify all nodes that would otherwise have been subject to a push message during the push phase, and may mark all such identified nodes as dirty. The pull phase may then be performed as described above.

Further, the scheduling graph could invoke one or more custom evaluators, as further described herein, that modify how evaluation proceeds for any subset of one or more nodes or for the entire evaluation graph. In this manner, the evaluation approach for the evaluation is customizable. Nodes are scheduled for evaluation in such a way that organizes access to shared states up front, thereby increasing the amount of parallel execution relative to prior approaches. The evaluation management system also generates links between the evaluation graph and the underlying dependency graph to reduce redundancy and further improve efficiency.

Figure 2:
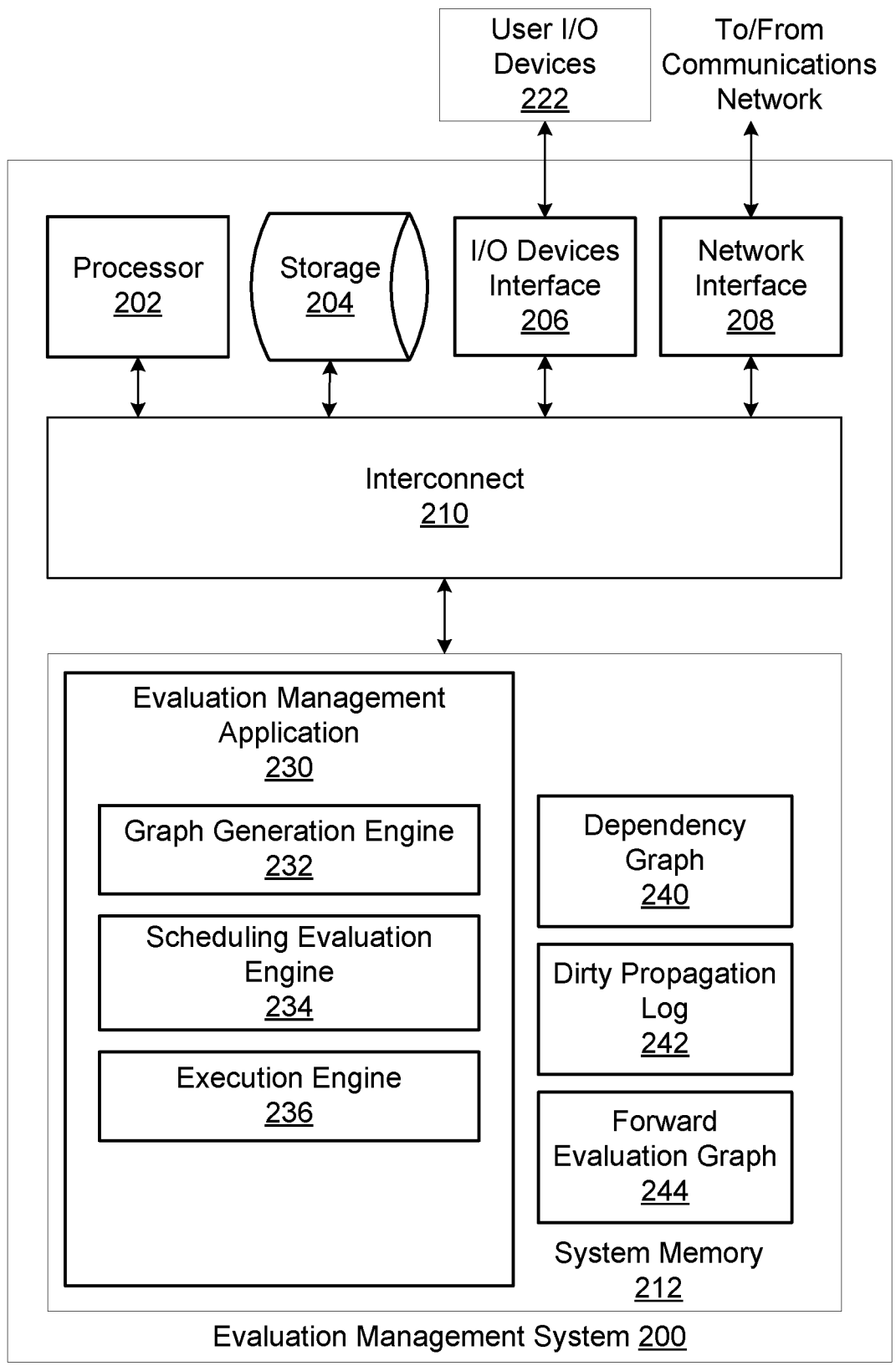
FIG. 2 is a block diagram of an evaluation management system that can be implemented via the computer system of FIG. 1, according to various embodiments of the present invention.

FIG. 2 is a block diagram of an evaluation management system 200 that can be implemented via the computing system 100 of FIG. 1, according to various embodiments of the present invention. In some embodiments, at least a portion of the evaluation management system 200 may be implemented via the computing system 100 of FIG. 1. As shown, the evaluation management system 200 includes, without limitation, a central processing unit (CPU) 202, storage 204, an input/output (I/O) devices interface 206, a network interface 208, an interconnect 210, and a system memory 212. The computing system 100 of FIG. 1 can be configured to implement the evaluation management system 200. The CPU 202, storage 204, I/O devices interface 206, network interface 208, interconnect 210, and system memory 212 function substantially the same as described in conjunction with FIG. 1 except as further described below.

The CPU 202 retrieves and executes programming instructions stored in the system memory 212. Similarly, the CPU 202 stores and retrieves application data residing in the system memory 212. The interconnect 210 facilitates transmission, such as transmission of programming instructions and application data, between the CPU 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

CPU 202 is included to be representative of a single CPU, multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). CPU 202 communicates to other computing devices and systems via network interface 208, where network interface 208 is configured to transmit and receive data via a communications network.

The system memory 212 includes, without limitation, an evaluation management application 230 that further includes a graph generation engine 232, a scheduling evaluation engine 234, an execution engine 236, an evaluation graph 240, dirty propagation data 240, and an evaluation graph 242.

The graph generation engine 232 generates an evaluation graph by traversing one or more nodes of a scene and processing dirty propagation messages during the traversal. As one example, the graph generation engine 232 could generate an evaluation graph based on a scene built via the Maya 3D animation, modeling, simulation, and rendering software from Autodesk, Inc.

In general, a dependency graph is a directed graph that includes a collection of entities, referred to herein as nodes, connected by edges. Unlike a directed acyclic graph, a dependency graph can include one or more cycles, where a set of nodes is connected by edges to form a continuous loop. Each node in a dependency graph, other than a root node, receives one or more data inputs from other nodes. The node performs one or more computations, where each computation may be based in part on one or more of the inputs to the node. The computations performed by a node in an evaluation graph may include, without limitation, computations related to model creation, deformation, animation, simulation, and audio processing. Each node, other than a leaf node, produces one or more outputs as a result of the computations performed by the node.

Each connection, or edge, of the dependency graph connects an output of one node, referred to as a source node, to the input of another node, referred to as a destination node. An edge identifies an input of a destination node that is dependent on a corresponding output of a source node. Taken together, the nodes and edges of the dependency graph identify the data interdependencies among the nodes of the dependency graph. The evaluation graph is generated based on the underlying dependency graph. A primary difference between a dependency graph and an evaluation graph is that a dependency graph node is connected at the input/output attribute level; whereas, an evaluation graph node is typically connected only at the node level.

When one or more nodes are marked as dirty, the graph generation engine 232 invalidates the current evaluation graph. Typically, one or more nodes are marked as dirty when the evaluation identifier (ID) changes, signifying that the time stamp has changed. As a result, nodes that are animated between the current time stamp/topology ID and the new time stamp/topology ID are marked as dirty. Marking such nodes as dirty reflects that the position and/or other attributes of such nodes may change when transitioning from the current time stamp/evaluation ID to the new time stamp/evaluation ID. Events other than a change in time stamp can change the evaluation ID, thereby invalidating the current evaluation graph. These events include, without limitation, a change in one or more values residing in one or more nodes, an instruction in an application program that marks one or more nodes as dirty, and a script program that marks one or more nodes as dirty.

In addition, a change in the topology ID indicates that a change in the structure, or topology, of the underlying dependency graph has occurred, such as when a node is added or removed, or a connection between nodes is made or broken. In such a condition, when the topology ID changes, the topology of the evaluation graph is invalidated. This condition triggers the rebuilding of a new evaluation graph representing the new topology. Once the new evaluation graph has been generated, all nodes in the new evaluation graph are marked as dirty, thereby stimulating an initial evaluation of all nodes in the new evaluation graph.

The graph generation engine 232 builds an evaluation graph by simulating a change for each attribute and input of the dependency graph, one at a time, and monitoring the messages produced by the dirty propagation process. The graph generation engine 232 identifies various types of dependencies, including, without limitation, (1) edge connections between nodes that identify dependencies between an output of one node and an input of another node; (2) intra-node dependencies between input and output attributes within the same node; (3) complex dependencies between dynamic attributes within one or more nodes; and (4) implicit dependencies between nodes that are not directly specified by the dependency graph.

The graph generation engine 232 generates the evaluation graph based on the dirty propagation messages for each attribute and input in the dependency graph. The evaluation graph thereby captures more detailed and finer granularity dependency information than identified by the dependency graph. In some embodiments, the evaluation graph may also capture dependencies related to reevaluations that may be performed for efficiency sake even when such reevaluations are not specifically requested. For example, if a node performs a computation for a motion path involving an "X" position, then a reevaluation involving the "X" position may cause a reevaluation of the "Y" and "Z" positions for the motion path even if reevaluation of the "Y" and "Z" positions is not specifically required. That is, the "X," "Y," and "Z" positions may be efficiently retrieved and reevaluated together even if a particular reevaluation involves only one or two of the positions.

When the structure, or topology, of the underlying dependency graph changes, such as when a node is added or removed, or a connection between nodes is made or broken, the topology ID changes. In response, the graph generation engine 232 constructs a new evaluation graph representing the new topology, corresponding to the new topology ID. During construction of the new evaluation graph, if a particular node is part of the new topology, the graph generation engine 232 resets the node by removing all upstream and downstream dependencies associated with the node. Removing all dependencies prepares the node for connection to the new topology. The graph generation engine 232 processes dirty messages associated with the node in order to reconnect the node to upstream and/or downstream nodes, based on the new topology. The graph generation engine 232 then resets these upstream and downstream nodes and reconnects these nodes to the new topology. The graph generation engine 232 continues to perform the reset/reconnect process continues until there are no remaining nodes marked as dirty that are also part of the new topology. Any remaining nodes are not part of the new topology, and, therefore, the graph generation engine 232 does not access these nodes during the construction of the new evaluation graph.

In order to differentiate between different versions of the evaluation graph, corresponding to different contexts, the graph generation engine 232 marks each version of the evaluation graph with an associated context identifier (ID). Prior to an evaluation, the graph generation engine 232 verifies that the context associated with requested evaluation matches the context of the current evaluation graph. If the context of the requested evaluation does not match the context of the current evaluation graph, then the graph generation engine 232 identifies the version of the evaluation graph that matches the context of thee requested evaluation graph prior to the evaluation. If the evaluation graph for the requested context is not generated, the graph generation engine 232 builds the evaluation graph for the requested context prior to the evaultion.

The scheduling evaluation engine 234 schedules various groups of nodes for execution by transforming the evaluation graph into a scheduling graph. The information stored in the scheduling graph is independent with respect to the information stored in the evaluation graph. As a result, the scheduling evaluation engine 234 can generate a new scheduling graph without rebuilding the evaluation graph. More particularly, the scheduling evaluation engine 234 determines which groups of nodes can be evaluated in parallel based on the evaluation graph. The scheduling evaluation engine 234 assigns such groups of nodes to different processing elements with a CPU and or a GPU for parallel execution. The scheduling evaluation engine 234 also determines whether a particular group of nodes needs to be evaluated prior to another group of nodes, and schedules such groups of nodes for serial execution. Because the evaluation graph has a complete description of input, output, and attribute dependencies, the scheduling evaluation engine 234 schedules nodes for parallel evaluation at a finer granularity relative to prior approaches and serializes node evaluation only where a true dependency exists. Where possible, the scheduling evaluation engine 234 schedules nodes for parallel evaluation via processing cores in the CPU and GPU. In the case of node dependences, the scheduling evaluation engine 234 schedules such nodes for serial evaluation.

Because the scheduling evaluation engine 234 encounters clean data during forward processing, the scheduling evaluation engine 234 does not trigger backward evaluation. If the scheduling evaluation engine 234 encounters a dependency in the backward direction, referred to herein as pull model evaluation, then the scheduling evaluation engine 234 evaluates the corresponding nodes in a safe mode using serial evaluation and schedules the corresponding nodes for repair in a subsequent generation of the evaluation graph. A group of executable instructions is thread-safe if the group of instructions only manipulates shared data structures in a manner that guarantees safe execution by multiple threads at the same time. Thread-safe instruction groups typically only access data that has been passed to the instruction group from other thread-safe instruction groups. Examples of groups of executable instructions that are not thread-safe include groups of instructions that access global variables or system resources. The scheduling evaluation engine 234 routes around any nodes that are not thread-safe, forcing such nodes to evaluate serially rather than in parallel. The scheduling evaluation engine 234 also forms clusters of nodes where such nodes can be grouped together for evaluation. In particular, if the scheduling evaluation engine 234 detects nodes that form a cycle or loop, the scheduling evaluation engine 234 groups such nodes into a special cycle cluster for evaluation.

In some embodiments, the scheduling evaluation engine 234 may schedule nodes in the evaluation graph for evaluation using one or more executors, including, without limitation, serial executors, serial cached executors, and parallel executors. Serial executors may traverse the evaluation graph and may schedule nodes for evaluation serially as each node is visited from an adjacent node during traversal. Serial cached executors may traverse the evaluation graph, schedule nodes for evaluation serially based on the traversal order of the nodes, and store the traversal order in a data structure such as a linked list. During subsequent scheduling passes, serial cached executors may schedule nodes for evaluation in the order specified by the data structure without performing an additional traversal of the nodes in the evaluation graph.

In some embodiments, the scheduling nodes of the scheduling graph may not be strictly related to the corresponding evaluation nodes in the evaluation graph. In one example, one evaluation node in the evaluation graph could be replaced by multiple scheduling nodes in the scheduling graph. In another example, the evaluation of multiple evaluation nodes in the evaluation graph could be replaced by a single scheduling node in the scheduling graph. Typically, such a scheduling node is referred to as a cluster. In yet another example, the evaluation nodes in the evaluation graph could be used as a general pattern to create the scheduling graph, but the evaluation graph is otherwise ignored when generating the scheduling graph. This latter example could be employed to schedule a stock math library to perform calculations and evaluations, rather than an expression node, in cases where expression nodes could be inherently thread-unsafe.

In some embodiments, when one or more nodes are scheduled as a cluster, the nodes within the cluster may be evaluated via any technically feasible computational approach as an alternative to the standard evaluation approach for nodes that are not included in a cluster. For example, any technically feasible runtime evaluation engine could be substituted for the standard evaluation computational logic. Such runtime evaluation engines could include, without limitation, MotionBuilder® from Autodesk, Inc., Softimage® from Autodesk, Inc., or Houdini™ from Side Effects Software, Inc. Even though the nodes could be evaluated via such an alternative runtime evaluation engine, the nodes would still be scheduled via the scheduling techniques described herein.

Stated another way, given a dependency graph describing a scene, the graph generation engine 232 of the evaluation management system 200 generates an evaluation graph based on the dependency graph that defines the relevant node dependencies for evaluation. The scheduling evaluation engine 234 of the evaluation management system 200 transforms the evaluation graph into a scheduling graph for performing the evaluation. Within each of the scheduling nodes in the scheduling graph, the corresponding evaluation nodes are evaluated via the standard evaluation approach described herein, via an alternative runtime evaluation engine, or via any technically feasible combination thereof.

Parallel executors may convert the evaluation graph into a scheduling graph and may schedule nodes for parallel evaluation where possible. Single nodes in the evaluation graph may be represented by a single node in the scheduling graph. Groups of nodes in the evaluation graph may be grouped together in a cluster, either for evaluation efficiency or for scheduling groups of nodes that include pull mode evaluation or a cycle. Groups of nodes in a cluster may be represented by multiple nodes in the evaluation graph, but by a single node in the scheduling graph.

In some embodiments, the scheduling evaluation engine 234 may schedule one or more groups of nodes for evaluation by one or more custom evaluators. In general, custom evaluators are runtime processes that can override the default evaluation approach for a subgroup of the nodes in the evaluation graph. When nodes are within a node subgroup associated with a particular custom evaluator, that custom evaluator assumes responsibility for evaluating the nodes within the node subgroup. Such custom evaluators may include, without limitation a dynamics evaluator, a prune roots evaluator, a deformer evaluator, a cache evaluator, a null evaluator, and a disabling evaluator.

In some embodiments, each custom evaluator may be disabled or enabled. If a custom evaluator is disabled, then the nodes associated with the custom evaluator are evaluated via another custom evaluator or via the standard evaluation process described herein. More specifically, if a custom evaluator is disabled then the nodes that would have otherwise been associated with that custom evaluator are free to be evaluated by other custom evaluators, or by the standard evaluation process. For example, if a node is currently evaluated by the cache evaluator, and the cache evaluator is subsequently disabled, then the node could be evaluated by another custom evaluator, such as the prune roots evaluator. Alternatively, the node could be evaluated by any other enabled custom evaluator or by the standard evaluation process. The custom evaluators are now described in further detail.

The dynamics evaluator temporarily disables evaluation when nodes of a certain type, referred to as "dynamics" nodes, are present in the scene represented by the evaluation graph. Dynamics nodes are not conducive to evaluation via the techniques disclosed herein. Consequently, the dynamics evaluator recognizes whether the evaluation graph includes one or more dynamics nodes. If one or more dynamics nodes are present, then the dynamics evaluator disables standard evaluation to ensure that dynamics nodes evaluate correctly. In some embodiments, the dynamics evaluator may evaluate the entire evaluation graph with a dependency graph push/pull model. As a result, evaluation graphs that include dynamics may not benefit from the performance gains associated with the disclosed techniques. In some embodiments, the dynamics evaluator may selectively disable evaluation for dynamics nodes on a node-by-node basis. As a result, evaluation graphs that include dynamics nodes may benefit from the performance gains associated with the disclose techniques with respect to nodes in the evaluation graph that are not dynamics nodes. In some embodiments, the dynamics evaluator may perform an alternative evaluation method that properly evaluates dynamics nodes without disable evaluation.

The prune roots evaluator optimizes evaluation by reducing or eliminating the overhead of processing an evaluation graph that includes many small leaf-level nodes, each with only a single dependency. Such evaluation graphs are associated with topologies that include small simple node networks. In such cases, the scheduling overhead associated with the disclosed techniques may exceed the actual evaluation performance gain. The prune roots evaluator removes the overhead of scheduling nodes that have no upstream dependencies.

The prune roots evaluator merges each leaf node that has no upstream dependencies and only a single downstream destination into the downstream node associated with the node. The prune roots evaluator performs the merge operation by creating a cluster containing all merged nodes and scheduling the cluster as a single entity. When the cluster is processed, the downstream node is evaluated normally, and the merged leaf node is evaluated via the pull model. As a final step the cluster evaluator iterates over all merged leaf nodes to properly finish evaluation, which is normally handled by the execution engine 236.

The deformer evaluator performs node evaluation for certain nodes that include complex evaluation processes. Nodes that are relatively simple to evaluate are typically evaluated via the standard evaluation process described herein. On the other hand, certain nodes are complex to evaluate. One such complex node type is the category of deformer nodes. Deformer nodes specify a deformation function, which is a common operation associated with computer animation. Such deformation functions include, without limitation, skinning deformations, blend shapes deformations, and wrap deformations.

Typically, deformation evaluation involves a significant amount of compute resources from the central processing unit. Efficient scheduling of such complex nodes via the disclosed techniques does not appreciably improve performance. This result is because the processing resources needed for evaluating this type of node is dominated by the evaluation process within the node itself and not by scheduling inefficiencies.

Rather, deformation nodes, and other complex node types, are efficiently processed with a dedicated parallel processor, such as a processor configured to perform general purpose processing on a graphics processing unit (GPGPU). A processor with such GPGPU capabilities is capable to evaluate multiple complex nodes in parallel. The deformer evaluator advantageously leverages the GPGPU capabilities of modern graphics processors by transferring complex nodes to the graphics processing unit (GPU) for evaluation. Generally, deformer nodes and other complex nodes exist in chains at the leaf level of the evaluation graph. The output of deformer nodes includes graphics primitives and other shapes that are ready for rendering and display.

The deformer evaluator implements various deformation types and other operations via code in a language designed for GPGPU operations, such as, for example, OpenCL. However, any suitable language designed for GPGPU operations may be used within the scope of the present invention. In some embodiments, the deformer evaluator may convert a method configured to evaluate the node via the CPU into a corresponding GPGPU method configured to evaluate the node via the GPU. Typically, the evaluation time is significantly less when a deformer node or other complex node is evaluated by the GPU, relative to when the node is evaluated by the CPU.

In some embodiments, performance may be further improved by chaining multiple deformer nodes together in the evaluation graph. In such embodiments, the GPU may chain evaluation of the multiple deformer nodes together without intervention by the CPU. As a result, the data transfer between the CPU and the GPU is reduced, where such data transfer is a typical in GPGPU programming. In some embodiments, performance may be further improved writing data resulting from evaluation of the deformer node back into a data block in memory. Rather, the graphics primitives resulting evaluation of the deformer nodes may be transferred to processing elements within the GPU for rendering and display.

The cache evaluator caches animated values associates with nodes in the evaluation graph in a time-indexed stream, and stores the time-indexed stream in a cache. In various embodiments, the cache evaluator may be configured to process all nodes in the evaluation graph. Alternatively, the cache evaluator may be configured to process only nodes of one or more specified types. If a particular node is scheduled for processing by the cache evaluator, then the cache evaluator determines whether the attribute values for the node are present within the cache. If the attribute values for the node are present within the cache, then the cache evaluator copies the values from the cache into the node. If, on the other hand, attribute values for the node are not present within the cache, then the cache evaluator invokes the execution engine 236 to evaluate the node. The cache evaluator then stores the values for the node, as computed by the execution engine 236, in the cache.

The null evaluator performs no evaluation function for the respective node and, instead, passes evaluation control directly back to the execution engine 236. In some embodiments, the null evaluator may be invoked in order to validate that custom evaluator overrides are working properly.

The disabling evaluator temporarily disables evaluation of the evaluation graph when nodes of a certain type are present within the scene represented by the evaluation graph. One or more node types may be specified. If the evaluation graph includes one or more nodes of any of the specified types, then the disabling evaluator disables evaluation of the evaluation graph. Stated another way, the disabling evaluator performs the same function as the dynamics evaluator, but for a specific node type or node types. By contrast, the dynamics evaluator is specifically configured to detect dynamics type nodes.

The frozen evaluator identifies nodes that should be tagged to skip evaluation through various configuration settings, and removes such nodes from the scheduling graph by placing the identified nodes into a single cluster node that is not evaluated. In one example, some dependency graphs and corresponding evaluation graphs could include invisible nodes, where the outputs of such nodes are invisible because the output are not currently needed or used for evaluation. In the traditional push/pull model, the evaluation of such nodes would not be triggered, because the invisible outputs of such nodes would not trigger a request for the needed inputs. However, with the evaluation graph approach described herein, the inputs for such nodes would always be evaluated, regardless of the visibility state, because invisible downstream nodes would not be able to inform upstream inputs that the inputs do not need to be evaluated. To solve this issue, the frozen evaluator freezes evaluation on invisible nodes by identifying such nodes, pruning the scheduling graph of such nodes, and placing such nodes into a single cluster that is not scheduled for evaluation. As a result, only those nodes whose outputs are actually used are scheduled for evaluation. In addition, the frozen evaluator may be employed to modify the configuration of the evaluation sequence.

When scheduling nodes for evaluation, the scheduling evaluation engine 234 first schedules node groups that are associated with one or more of the custom evaluators described above. The scheduling evaluation engine 234 then schedules node groups that include one or more cycles. Finally, the scheduling evaluation engine 234 schedules nodes that are not associated with any custom evaluators and are not in a cycle.

The execution engine 236 evaluates the groups of nodes according to the assignments determined by the scheduling evaluation engine 234. Because dirty propagation is disabled, the execution engine 236 encounters clean data as the execution engine 236 performed evaluation of the nodes. For nodes and node clusters that can be scheduled for parallel evaluation, the execution engine 236 assigns such nodes and node clusters to different processing cores in the CPU and GPU.

Dirty propagation data is disabled during node evaluation. Consequently, the execution engine 236 employs an alternative approach to track whether inputs, outputs, or attributes are out of date. Via the alternative approach, the execution engine 236 performs tracking with a series of evaluation identifiers (IDs). Each evaluation pass is assigned a unique, monotonically increasing master evaluation ID. The execution engine 236 tags each newly generated values for input, output, and attribute value with a slave ID matching the current master ID. During subsequent evaluation passes, the execution engine 236 compares the slave ID of the input, output, and attribute values with the current master ID of the evaluation pass to determine whether the input, output, and attribute values are up to date. If the slave ID is less than the current master ID, then the corresponding input, output, or attribute is out of date and should be reevaluated. The execution engine 236 performs input, output, and attribute values with the current master ID. If the slave ID is equal to the current master ID, then the corresponding input, output, or attribute is up to date, and the execution engine 236 does not evaluate the input, output, or attribute.

Figure 3A:
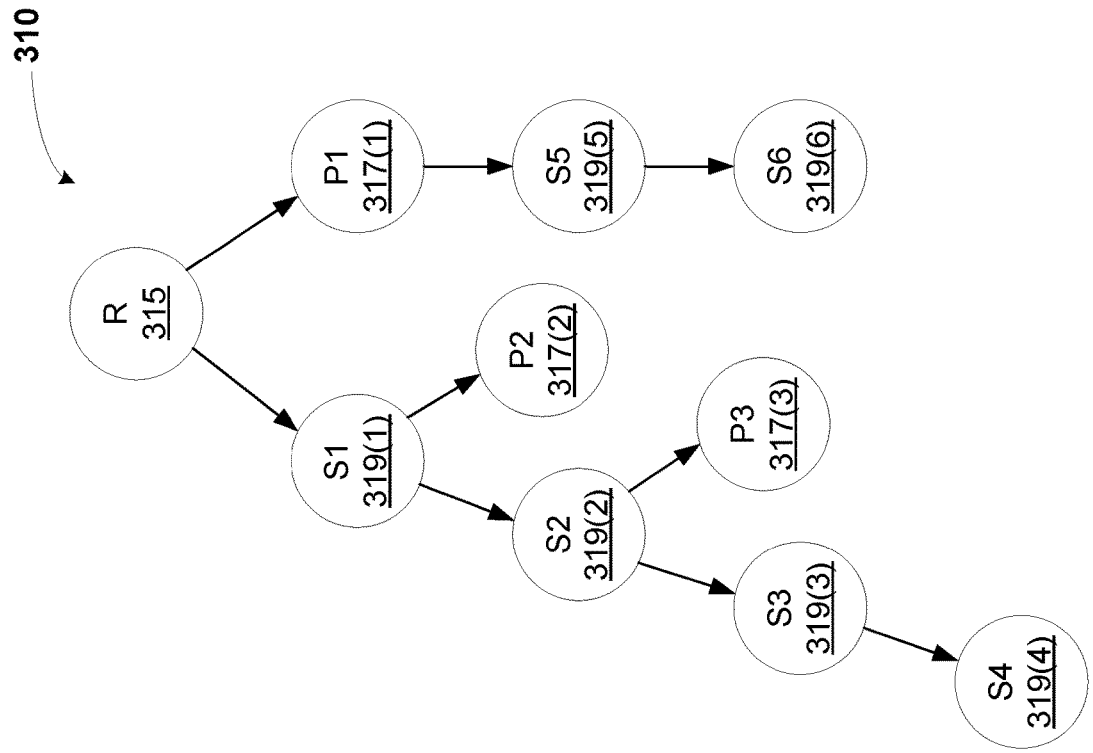
FIGS. 3A-3C illustrate how groups of nodes included in an evaluation graph are scheduled, according to various embodiments of the present invention.
Figure 3A:
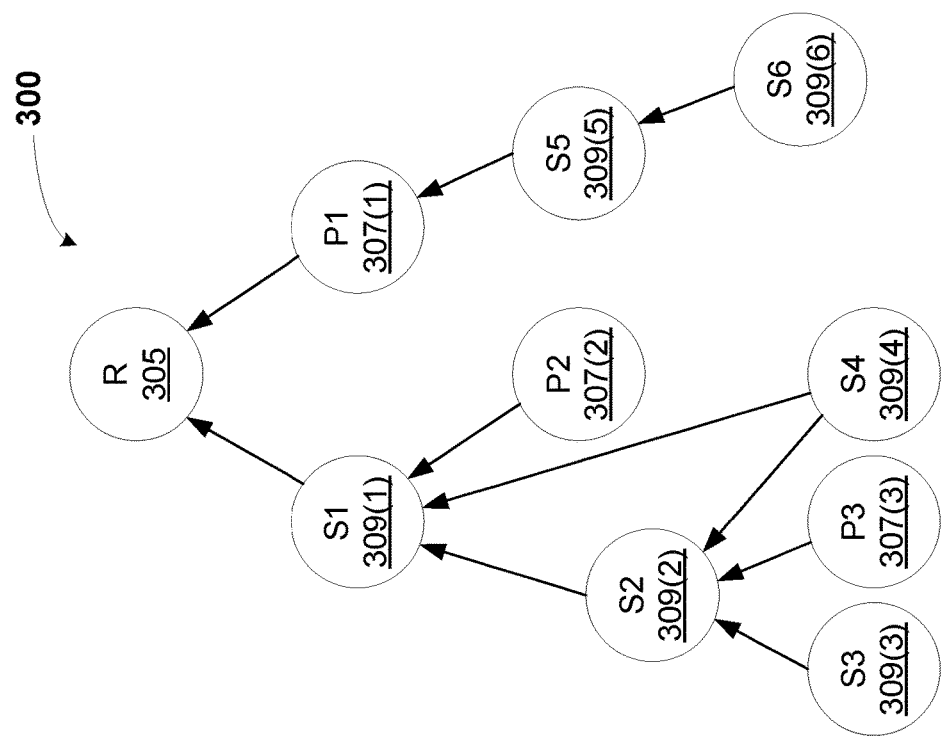
Figure 3B:
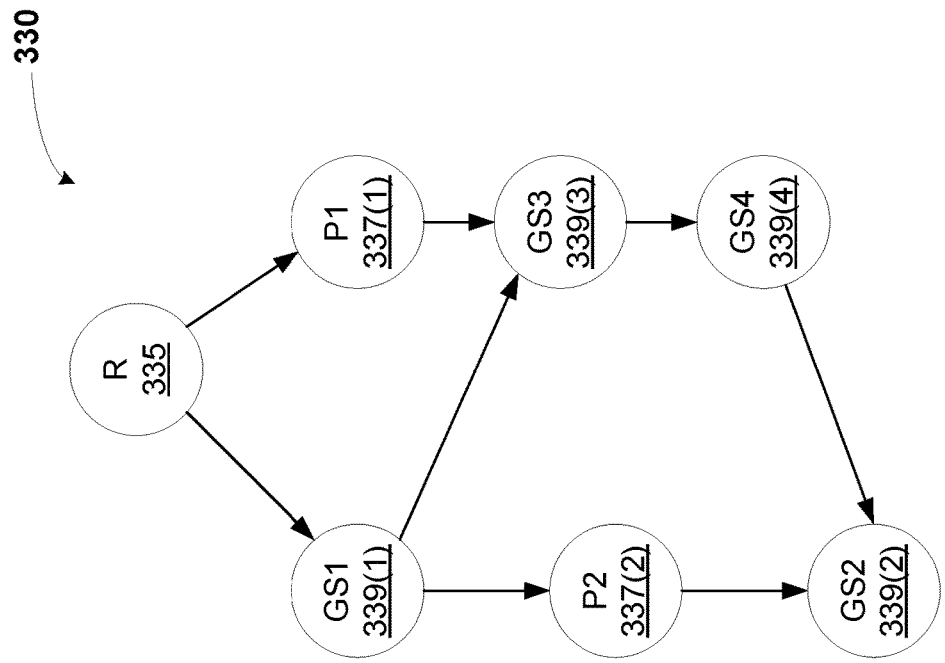
Figure 3B:
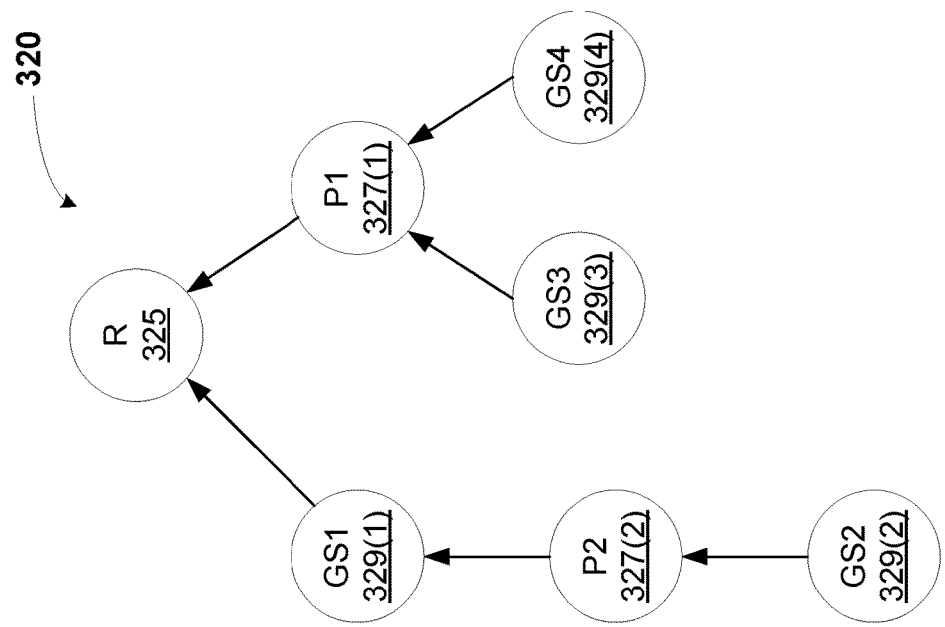
Figure 3C:
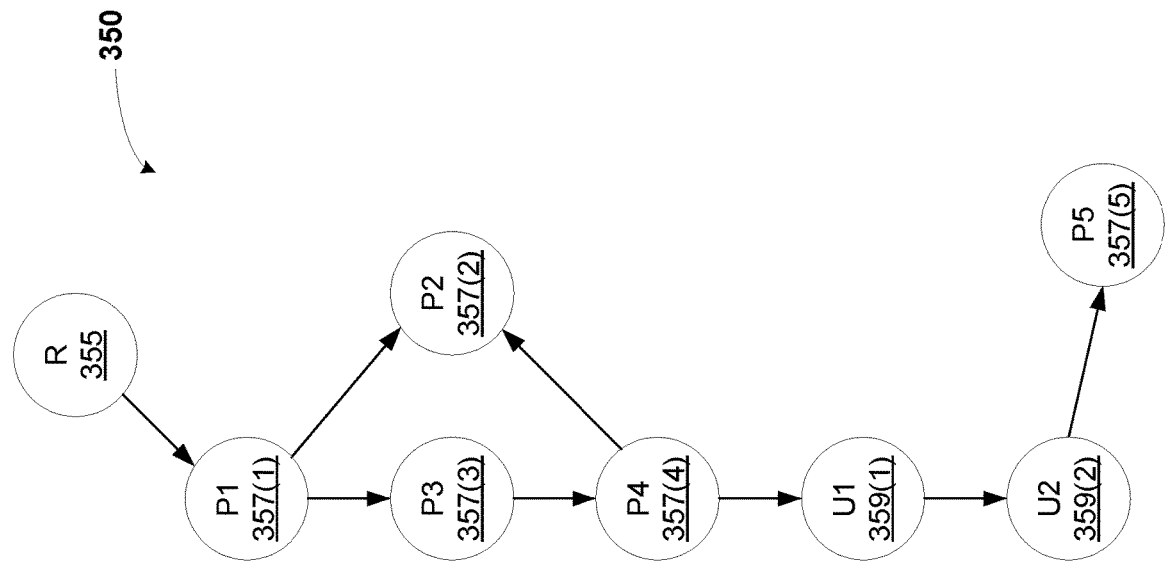
Figure 3C:
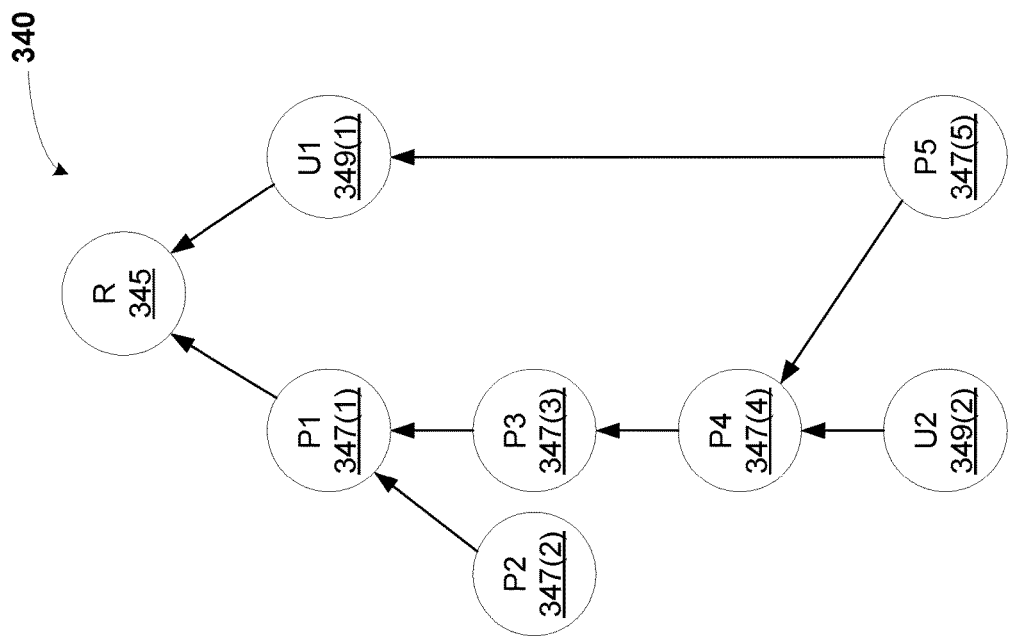

FIGS. 3A-3C illustrate how groups of nodes included in an evaluation graph are scheduled, according to various embodiments of the present invention. In general, the scheduling evaluation engine 234 transforms the evaluation graph into a scheduling graph by considering the dependencies indicated in the evaluation graph and state sharing among various nodes within the evaluation graph. Typically, with prior approaches, when multiple nodes share state associated with a scarce resource, a first node acquires access to the state by securing a lock on the state. Once the lock is acquired, the execution engine 236 evaluates the first node. Other nodes sharing the state wait for the lock to be released before the other nodes can be evaluated. In the meantime, the other nodes consume processing resources while waiting to acquire a lock. As an alternative to a lock approach, the scheduling evaluation engine 234 schedules nodes in a manner that avoids the use of locks, thereby alleviating the issues described above. More specifically, the scheduling evaluation engine 234 schedules nodes that share state in a manner that organizes and serializes access to the shared resources without a need for a lock mechanism. In general, nodes scheduled for evaluation in the serial mode are evaluated one node at a time via the forward evaluation approach. Nodes scheduled for evaluation in the parallel mode are accelerated through computing multiple nodes at the same time on different threads wherever possible. The nodes are scheduled in a manner so as to avoid collisions by employing various approaches, including, without limitation, local serialization, global serialization, and untrusted execution.

Local serialization involves a scheduling condition where multiple nodes access the same common data in the corresponding parent node. Access to the common data is not locked to a single node at a time. Rather, the multiple nodes are scheduled for serial evaluation, thereby ensuring that only one node accesses the common data at any given time without the use of a lock. Global serialization involves a scheduling condition specifying that no more than one node of a given type can execute at any given time. Nodes of other types can be executed in parallel with these globally serialized nodes. Untrusted execution involves a scheduling condition specifying that whenever a node of an untrusted type is being evaluated, no other nodes can be evaluated at the same time. This scheduling condition effectively throttles parallel evaluation into a single serial path for the duration of the evaluation of the untrusted node. Untrusted scheduling is used when a node can unpredictably access data from anywhere in the evaluation graph.

As shown in FIG. 3A, an evaluation graph 300 is transformed into a scheduling graph 310 via local serialization. The scheduling evaluation engine 234 employs local serialization when multiple nodes seek access to the same shared data, typically from the parent node. The scheduling evaluation engine 234 locally serializes nodes that access a shared component. The scheduling evaluation engine 234 further schedules nodes that do not access a shared component, referred to as parallel nodes, for parallel evaluation. As shown, the evaluation graph 300 includes, without limitation, a root node 305, three parallel nodes 307(1-3), and six local serialization nodes 309(1)-309(6). The arrows in the evaluation graph 300 indicate dependency of one node to another node. For example, both parallel node 307(1) and local serialization node 309(1) depend on one or more outputs or attributes from root node 305. Parallel node 307(2) and local serialization nodes 309(2) and 309(4) depend on one or more outputs or attributes from local serialization node 309(1), and so on.

The scheduling graph 310 includes, without limitation, a root node 315, three parallel nodes 317(1)-317(3), and six local serialization nodes 319(1)-319(6), corresponding to the root node 305, parallel nodes 307(1)-307(3), and local serialization nodes 309(1)-309(6) of the evaluation graph 300, respectively. The arrows on the scheduling graph 310 indicate the evaluation order of the nodes. Local serialization nodes 309(1), 309(2), 309(3), and 309(4) depend on one or more shared values such that only one of local serialization nodes 309(5) and 309(6) can access the shared values at a time. The scheduling graph 310 preserves the dependencies shown in the evaluation graph 300. In addition, the scheduling graph 310 schedules local serialization nodes 319(1), 319(2), 319(3), and 319(4) for serial evaluation so that one on of these four nodes accesses the shared values at any given time. Likewise, local serialization nodes 309(5) and 309(6) depend on one or more shared values such that only one of local serialization nodes 309(5) and 309(6) can access the shared values at a time. Because local serialization nodes 309(5) and 309(6) are already serialized in the evaluation graph 300, local serialization nodes 319(5) and 319(6) are scheduled for serial execution.

As shown in FIG. 3B, an evaluation graph 300 is transformed into a scheduling graph 350 via global serialization. The scheduling evaluation engine 234 globally serializes nodes where only one global serialization node is allowed to enter a critical section of code execution at a given time. The scheduling evaluation engine 234 further schedules nodes that do not access the critical section of code, referred to as parallel nodes, for parallel evaluation. Although only one global serialization node is scheduled for evaluation at a time, other nodes, including locally serialized nodes and parallel nodes, can be scheduled for evaluation at the same time as a global serialization node. As shown, the evaluation graph 320 includes, without limitation, a root node 325, two parallel nodes 327(1)-327(2), and four global serialization nodes 329(1)-329(4). The arrows in the evaluation graph 320 indicate dependency of one node to another node.

The scheduling graph 330 includes, without limitation, a root node 335, two parallel nodes 337(1)-337(2), and four global serialization nodes 339(1)-339(4), corresponding to the root node 325, parallel nodes 327(1)-327(2), and global serialization nodes 329(1)-329(4) of the evaluation graph 320, respectively. The arrows on the scheduling graph 330 indicate the evaluation order of the nodes. The scheduling graph 330 preserves the dependencies shown in the evaluation graph 320. In addition, the scheduling graph 330 schedules global serialization nodes 339(1), 339(2), 339(3), and 339(4) for serial execution, ensuring that only one is evaluated at a given time.

As shown in FIG. 3C, an evaluation graph 300 is transformed into a scheduling graph 350 for untrusted evaluation. The scheduling evaluation engine 234 employs untrusted evaluation scheduling when one or more nodes access resources in an unpredictable manner. As one example, a node could be considered as untrusted if the node is configured access the node is configured to access any available resource at any given time. In such cases, the manner in which the node accesses shared resources would be unpredictable because the scheduling graph 350 cannot predict in advance the set of resources that the node accesses during any given time step. As a result, no other node that could be scheduled for evaluation which such an untrusted node is evaluated. Because the scheduling evaluation engine 234 is unable to fully determine dependencies associated with an untrusted node in advance, the scheduling evaluation engine 234 schedules untrusted nodes for evaluation such that no other node is evaluated is scheduled while an untrusted node is evaluated. As shown, the evaluation graph 340 includes, without limitation, a root node 345, five parallel nodes 347(1)-347(5), and two untrusted nodes 349(1)-349(2). The arrows in the evaluation graph 340 indicate dependency of one node to another node.

The scheduling graph 350 includes, without limitation, a root node 355, five parallel nodes 357(1)-357(5), and two untrusted nodes 359(1)-359(2), corresponding to the root node 345, parallel nodes 347(1)-347(5), and untrusted nodes 349(1)-349(2) of the evaluation graph 340, respectively. The arrows on the scheduling graph 350 indicate the evaluation order of the nodes. The scheduling graph 350 preserves the dependencies shown in the evaluation graph 340. In addition, the scheduling graph 350 schedules each of the untrusted nodes 359(1) and 359(2) to be evaluated alone, ensuring that no other nodes are scheduled for evaluation when an untrusted node is scheduled for evaluation.

In various embodiments, the scheduling evaluation engine 234 may employ parallel scheduling, local serialization, global serialization, and untrusted evaluation in any technically feasible combination.

Figure 4:
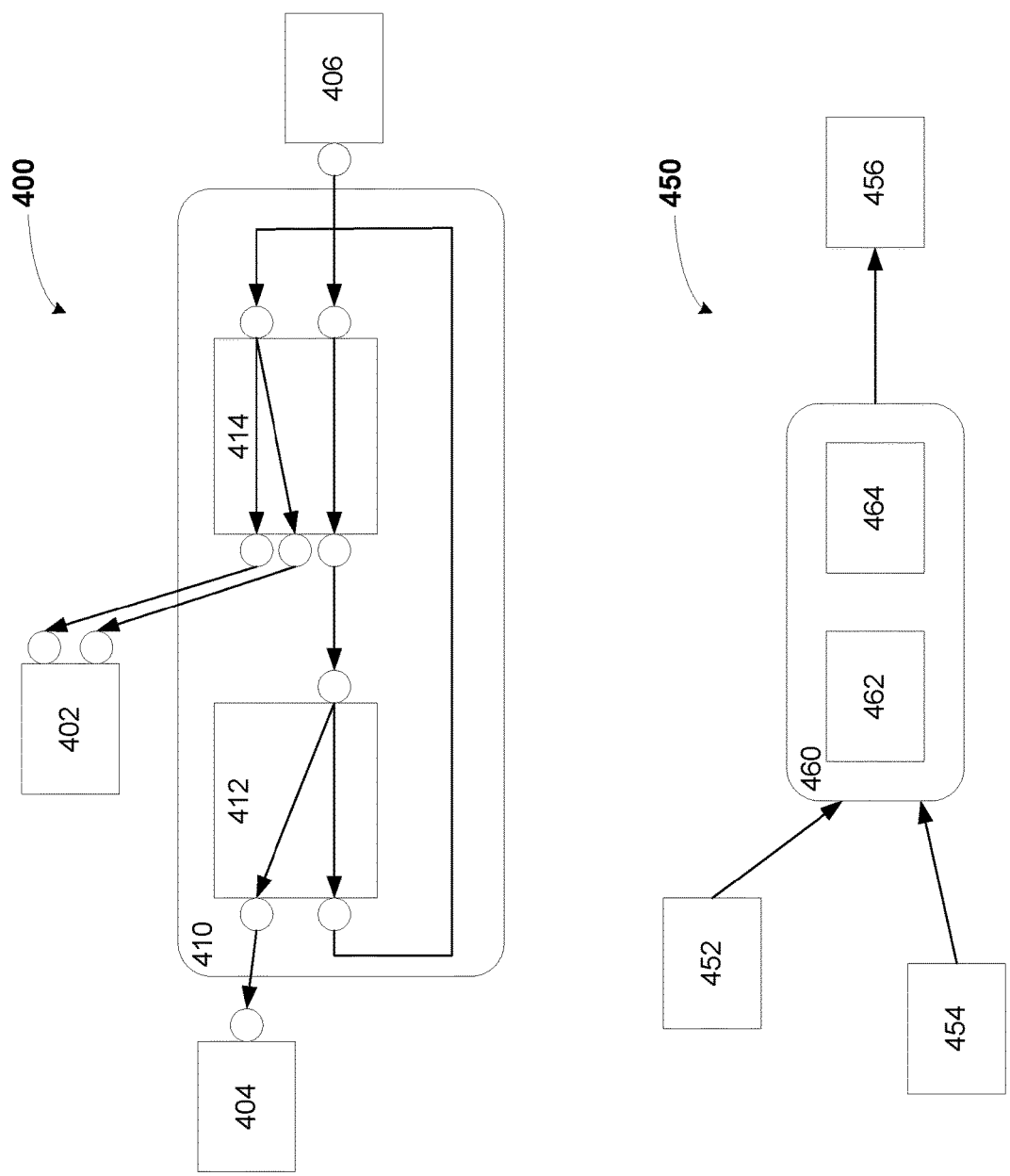
FIG. 4 illustrates how a group of nodes included in an evaluation graph that includes a cycle is scheduled, according to various embodiments of the present invention.

FIG. 4 illustrates how a group of nodes included in an evaluation graph that includes a cycle is scheduled, according to various embodiments of the present invention. As shown, dependency graph 400 includes, without limitation, nodes 402, 404, 406, 412, and 414. Corresponding evaluation graph 450 includes, without limitation, nodes 452, 454, 456, 462, and 464.

Node 414 depends on an output from node 412, while node 412 also depends on an output from node 414, thereby forming a cycle 410. Further, node 412 depends on an output from 404, while node 414 depends on outputs from node 402. However, neither of nodes 402 and 404 depends on outputs from nodes 412 or 414, indicating that nodes 402 and 404 are not within the cycle 410. Likewise, node 406 depends on an output from node 414, but neither node 412 nor node 414 depends on an output from node 406, indicating that node 406 is also not within the cycle 410. Because of the interdependency of nodes 412 and 414, the scheduling evaluation engine 234 forms a cluster 460 in the dependency graph 450 corresponding to the cycle 410 within the dependency graph 400. The scheduling evaluation engine 234 schedules the cycle 460 to be evaluated as a unit to ensure that the dependency ambiguity does not occur during evaluation.

Figure 5:
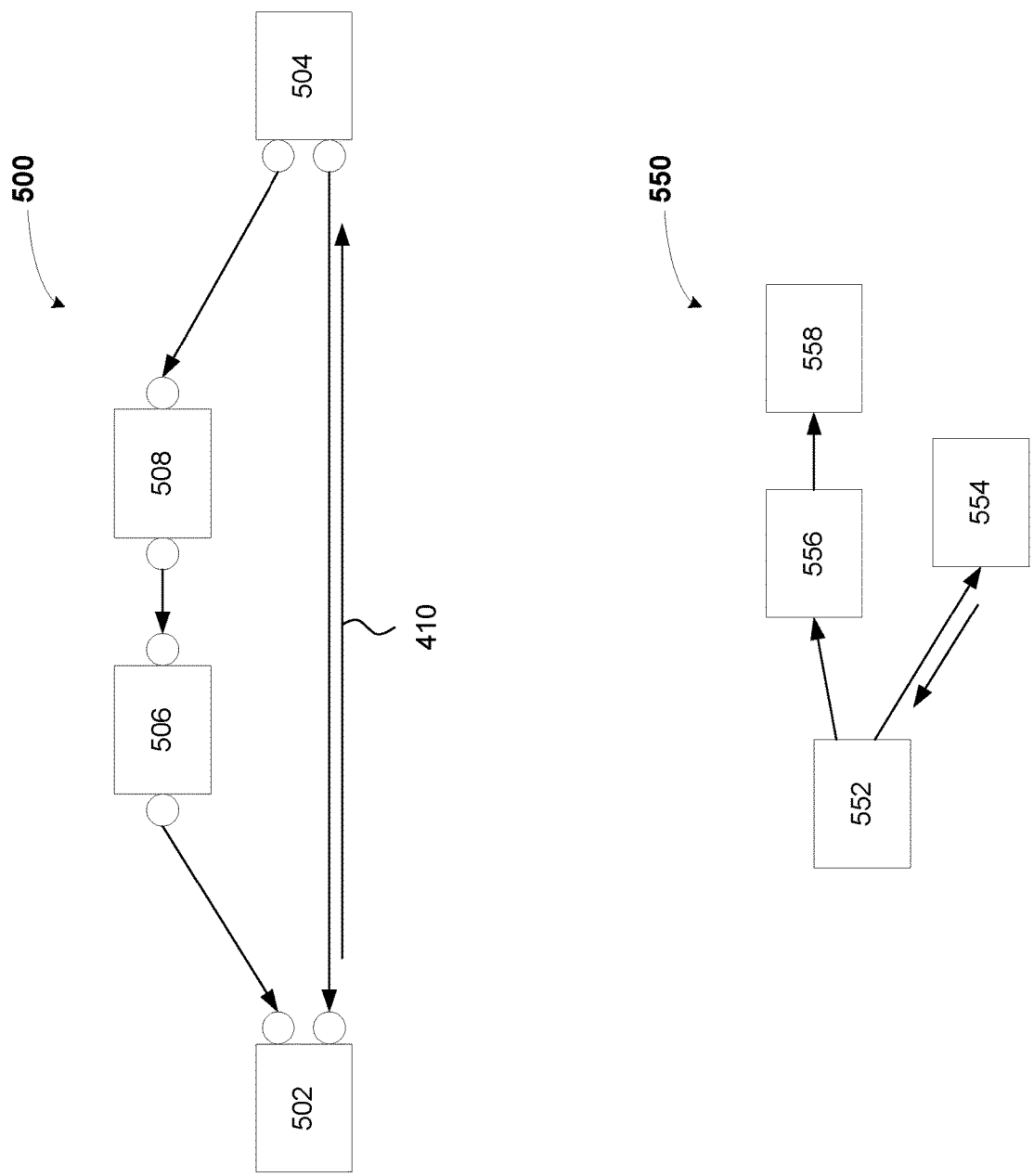
FIG. 5 illustrates how nodes included in an evaluation graph with pull mode evaluation are scheduled, according to various embodiments of the present invention.

FIG. 5 illustrates how nodes included in an evaluation graph with pull mode evaluation are scheduled, according to various embodiments of the present invention. As shown, dependency graph 500 includes, without limitation, nodes 502, 504, 506, and 508. Corresponding evaluation graph 550 includes, without limitation, nodes 552, 554, 556, and 558.

Node 506 depends on an output from node 504, node 508 depends on an output from node 506, and node 504 depends on outputs from nodes 502 and 508. In addition, node 502 employs pull model evaluation with respect to node 504, as indicated by arrow 510. When generating the corresponding evaluation graph 550, the scheduling evaluation engine 234 schedules node 554 to evaluate on a different branch from nodes 556 and 558. Node 554 and nodes 556 and 558 evaluate serially with respect to node 552. The scheduling evaluation engine 234 detects the invocation of the pull model evaluation between nodes 502 and 504, which typically indicates a scheduling error in the dependency graph 500. As a result, when generating the corresponding evaluation graph 550, the scheduling evaluation engine 234 schedules node 554 to evaluate on a different branch from nodes 556 and 558. Node 554 and nodes 556 and 558 evaluate serially with respect to node 552.

Figure 6:
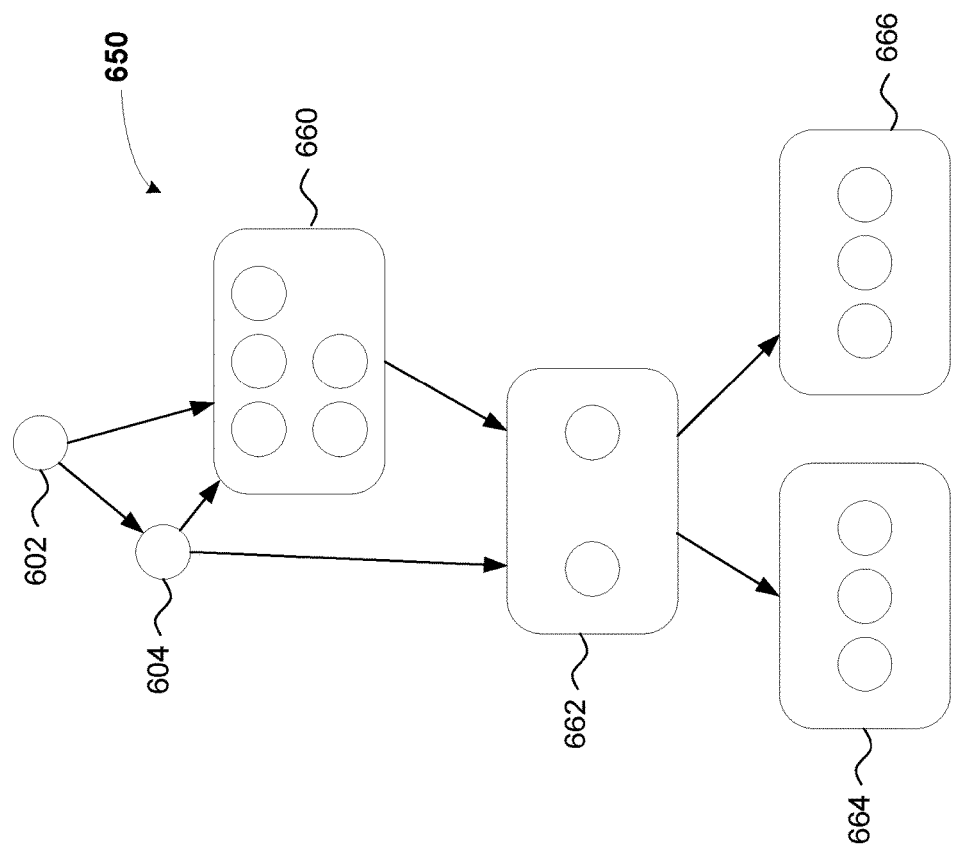
FIG. 6 illustrates how groups of nodes included in an evaluation graph are organized into clusters, according to various embodiments of the present invention.
Figure 6:
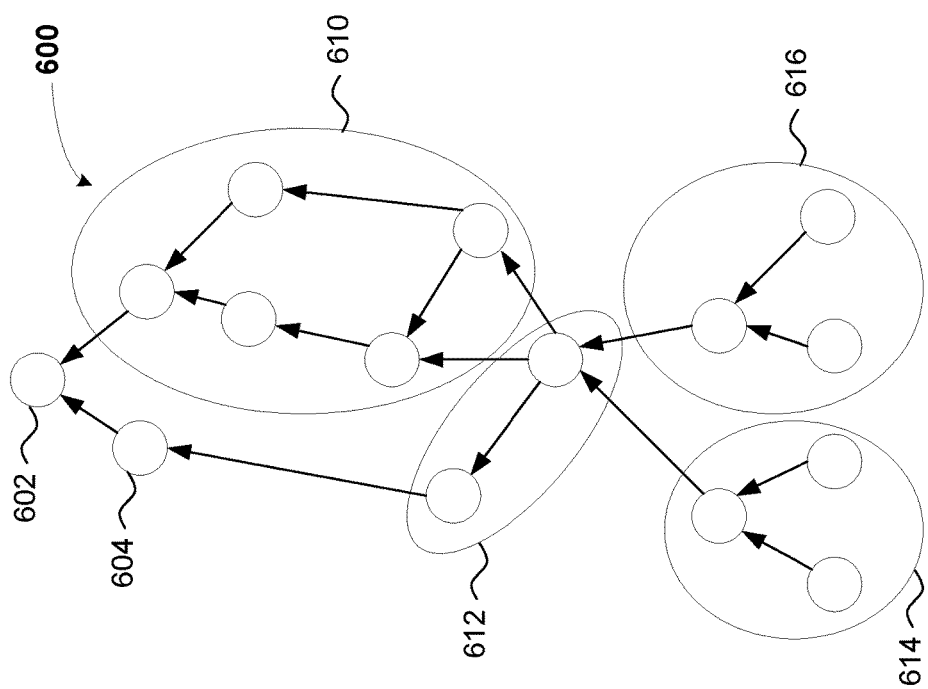

FIG. 6 illustrates how groups of nodes included in an evaluation graph are organized into clusters, according to various embodiments of the present invention. As shown, dependency graph 600 includes, without limitation, root node 602, node 604, and node groups 610, 612, 614, and 616. The nodes in node groups 610, 612, 614, and 616 may be grouped together due to a cycle or a pull model evaluation within the node group. Alternatively, the nodes in node groups 610, 612, 614, and 616 may be grouped together for efficient evaluation. The scheduling evaluation engine 234 forms clusters 660, 662, 664, and 666 in the scheduling graph 650 corresponding to node groups 610, 612, 614, and 616, respectively. Nodes within a particular cluster 660, 662, 664, and 666 are scheduled to be evaluated as a unit. In this manner, clusters 660, 662, 664, and 666 are evaluated as if a cluster 660, 662, 664, and 666 is a single node. Nodes within a cluster 660, 662, 664, and 666 are evaluated in any technically feasible manner. The scheduling evaluation engine 234 may form clusters and remove existing clusters during any scheduling evaluation pass. In addition, a cluster may be merged with one or more other nodes or clusters, forming a new cluster that includes the merged elements.

Figure 7:
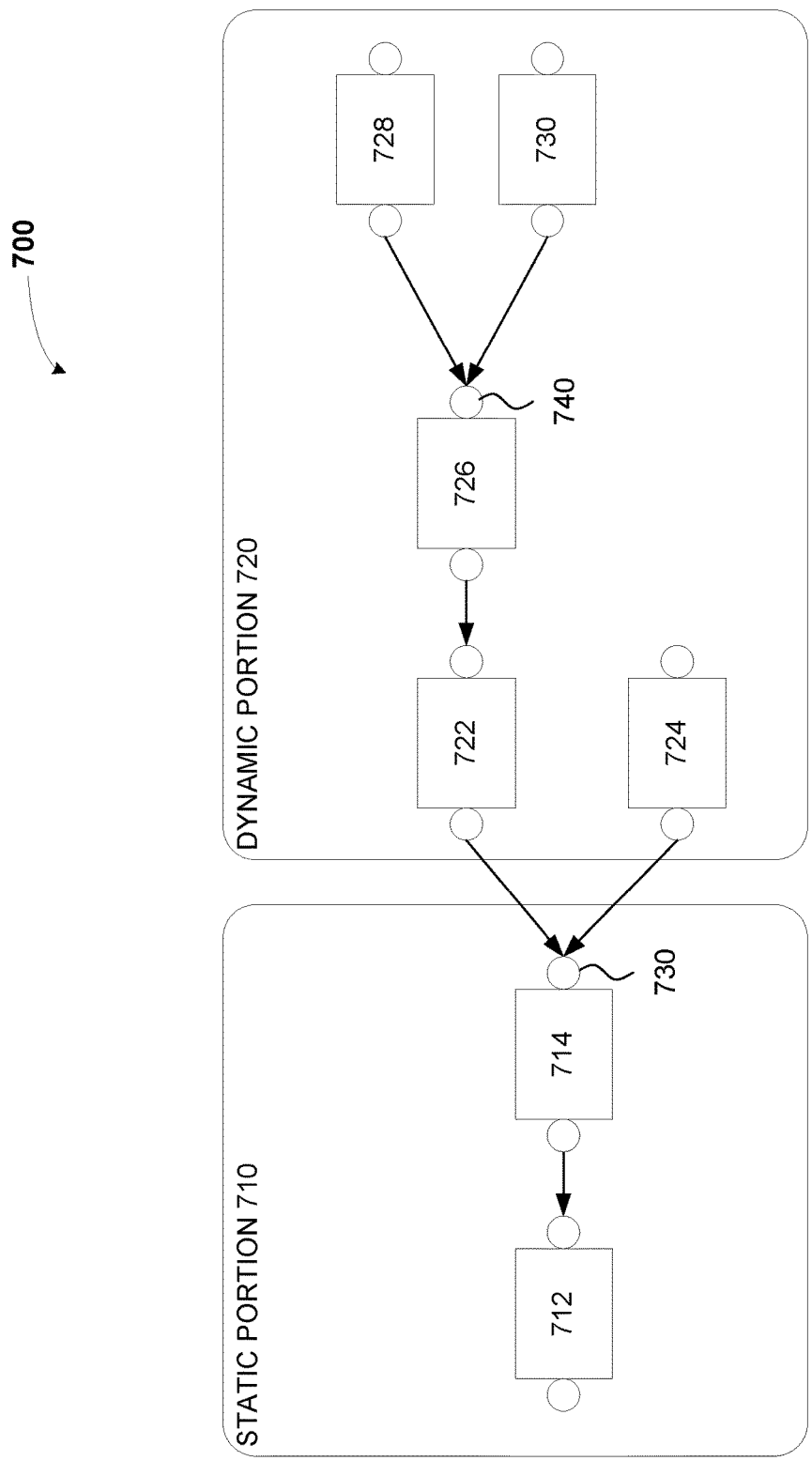
FIG. 7 illustrates how the evaluation management system of FIG. 2 controls data block caching, according to various embodiments of the present invention.

FIG. 7 illustrates how the evaluation management system 200 of FIG. 2 controls data block caching, according to various embodiments of the present invention. As shown, the evaluation graph 700 includes, without limitation, a static portion 710 and a dynamic portion 720. Nodes 712 and 714 of the static portion 710 represent those portions of the 3D scene that do not move or animate over time. In the static portion 710, the values for the nodes do not change as the 3D scene is animated. That is, the evaluation for nodes 712 and 714 are not dependent on the time step. Nodes 722, 724, 726, 728 and 730 of the dynamic portion 720 represent those portions of the 3D scene that move or animate over time. That is, the evaluation for nodes 722, 724, 726, 728 and 730 are dependent on the time step.

Because nodes 712 and 714 are in the static portion 710, the inputs, outputs, and attributes associated with nodes 712 and 714 do not change over time. Consequently, nodes 712 and 714 may be evaluated once, and the resulting data blocks may be stored, or cached, at the output 730 of node 714 for future evaluation passes. The execution engine 236 thereby avoids multiple evaluation of nodes 712 and 714 in the static portion 710 of the evaluation graph 700, leading to improved performance. This process is referred to as data block caching. Data block caching may also be used within the dynamic portion 720 of the evaluation graph 700 where two nodes 728 and 730 are both dependent on the same output 740 of node 726. With data block caching, node 726 may be evaluated once, and the resulting data block may be stored, or cached, at the output 740 of node 726. As a result, the data block is available for both nodes 728 and 730 when the execution engine 236 evaluates nodes 728 and 730.

Figure 8:
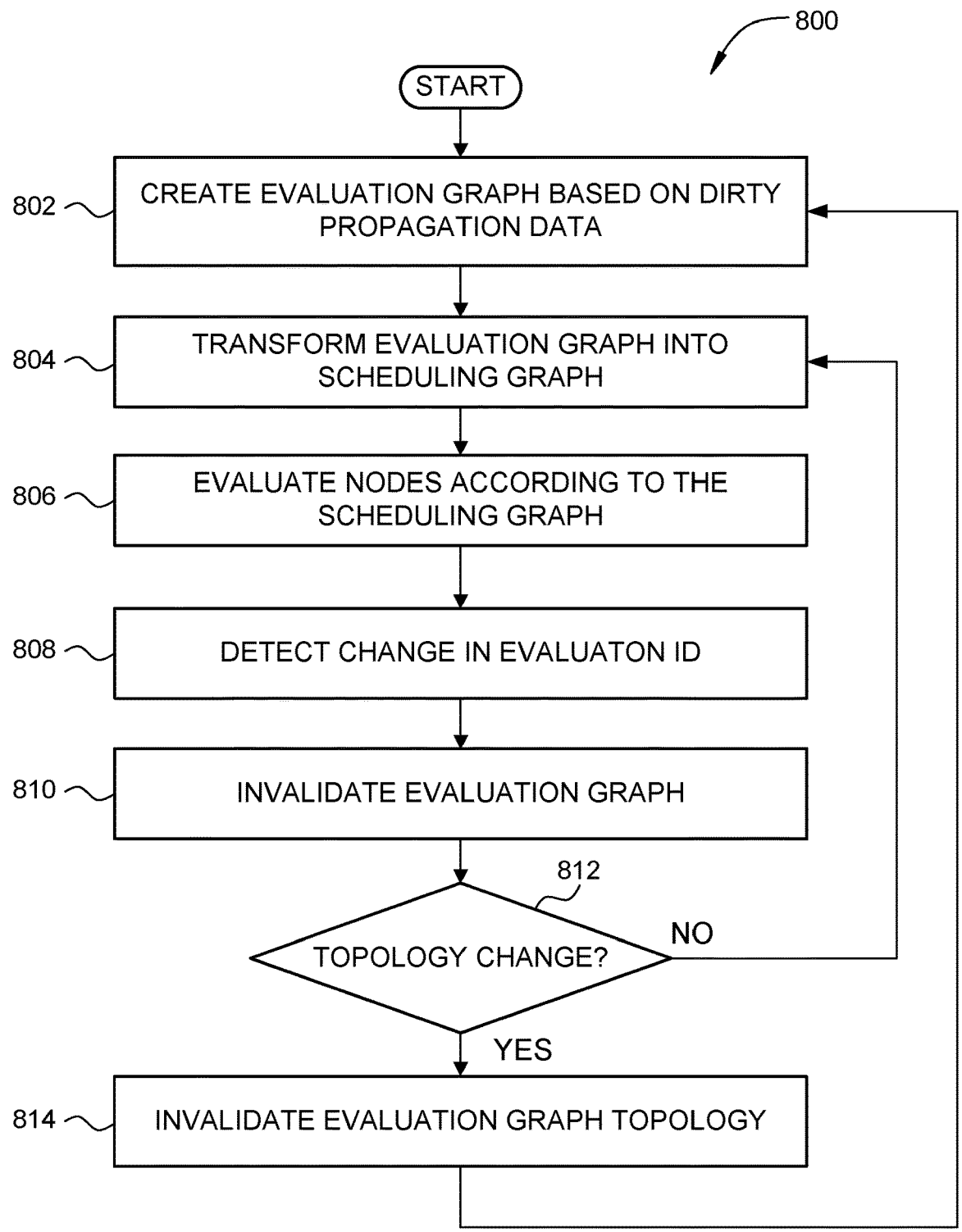
FIG. 8 is a flow diagram of method steps for processing an evaluation graph associated with a three-dimensional animation scene, according to various embodiments of the present invention.

FIG. 8 is a flow diagram of method steps for processing an evaluation graph associated with a three-dimensional animation scene, according to various embodiments of the present invention. Although the method steps are described in conjunction with the systems of FIGS. 1-7, persons skilled in the art will understand that any system configured to perform the method steps, in any order, is within the scope of the present invention.

As shown, a method 800 begins at step 802, where a graph generation engine 232 generates an evaluation graph based on dirty propagation data. The graph generation engine 232 generates a new evaluation graph if no evaluation graph yet exists or if the current evaluation graph is invalidated. The graph generation engine 232 generates the evaluation graph by traversing the nodes that are included in the new topology and by monitoring dirty propagation data, typically in the form of dirty propagation messages.

At step 804, a scheduling evaluation engine 234 transforms the evaluation graph into a scheduling graph. In general, a one-to-one correspondence between the nodes of the evaluation graph and the scheduling graph. The scheduling graph preserves the dependencies of the evaluation graph, and also schedules locally serialized, globally serialized, and untrusted nodes for evaluation. More specifically, scheduling graph preserves the dependencies that appear at the level of the scheduling graph nodes. In one example, a scheduling node, such as a cluster, could include multiple evaluation graph nodes within the single scheduling node. In such cases, the scheduling node would be free to either preserve or ignore the dependencies of the evaluation nodes within the cluster in order to properly evaluate the individual evaluation nodes within the scheduling node. Further, the scheduling graph may specify one or more custom evaluators for evaluating certain node groups. Further, some node groups may be organized into a cluster, where the nodes in the cluster are evaluated as if the cluster is a single node.

At step 806, an execution engine 236 evaluates the nodes according to the schedule defined by the scheduling graph. At step 808, the execution engine 236 detects a change in the evaluation ID, indicating that a new scheduling and evaluation pass should be performed. The evaluation ID may change in response to a change in the time step or that some other condition has caused one or more nodes to be marked as dirty. At step 810, the graph generation engine 232, invalidates the current evaluation graph. At step 812, the execution engine 236 determines whether the topology of the dependency graph has changed. The execution engine 236 determines that the topology of the dependency graph has changed by determining that the topology ID has changed. In general, the topology ID changes in response changes in the structure, or topology, of the underlying dependency graph, such as when a node is added or removed, or a connection between nodes is made or broken.

If the topology of the dependency graph has changed, then the method 800 proceeds to step 814, where the graph generation engine 232, invalidates the current evaluation graph topology. The method 800 then proceeds to step 802, described above, to generate a new evaluation graph based on the change to the topology of the evaluation graph.

Returning to step 812, if the topology of the dependency graph has not changed, then the method 800 proceeds to step 804, described above for scheduling and evaluating the nodes in the evaluation graph.

In sum, an evaluation management system that includes various executable engines traverses a dependency graph associated with objects in a 3D animation scene. The graph generation engine traverses the nodes of an evaluation graph and logs dirty propagation messages transmitted during the traversal. The dirty propagation messages indicate which nodes are dependent on each other and how the node dependencies are interconnected. The graph generation engine builds an evaluation graph based on the logged dirty propagation messages. The scheduling evaluation engine schedules various groups of nodes for execution. More particularly, the scheduling evaluation engine determines which groups of nodes can be evaluated in parallel based on the evaluation graph. The scheduling evaluation engine assigns such groups of nodes to different processing elements with a CPU and or a GPU for parallel execution. The scheduling evaluation engine also determines whether a particular group of nodes needs to be evaluation prior to another group of nodes, and schedules such groups of nodes for serial execution. The execution engine evaluates the groups of nodes according to the assignments determined by the scheduling evaluation engine. The graph update engine tracks changes in the topology of the objects in the 3D scene from one time step to the next time step and propagates the topology changes to the dependency graph for the next evaluation cycle. In addition, the evaluation management system properly analyzes, schedules, and evaluates groups of nodes that include a cycle or loop, as well as groups of nodes to be evaluated by one or more custom evaluators.

At least one advantage of the disclosed techniques is that nodes in a dependency graph are evaluated in parallel at a finer granularity relative to prior approaches. As a result, the time needed to evaluate independent nodes may be reduced, when scheduled on a multithreaded system, leading to faster and more interactive playback and manipulation of animated objects in a 3D scene. Another advantage of the disclosed techniques is that cycles formed by two or more nodes are correctly evaluated. In particular, nodes that form a cycle are grouped into a cluster, where the cluster is evaluated as if the cluster were a single node. As a result, clusters that include a cycle are correctly evaluated even if such clusters are evaluated in parallel with other nodes or clusters, leading to more robust evaluation of the dependency graph nodes.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
determining that a first node included in a first plurality of nodes depends on a first output generated by a second node that also is included in the first plurality of nodes; and
generating an evaluation graph associated with a three-dimensional animation scene that includes a third node corresponding to the first node, a fourth node corresponding to the second node, and an indication that the third node depends on the fourth node.

2. The method of claim 1, further comprising scheduling the third node for evaluation after the fourth node has been evaluated.

3. The method of claim 1, further comprising:
determining that a fifth node that also is included in the first plurality of nodes does not depend on the first node;
generating a sixth node corresponding to the fifth node;
modifying the evaluation graph to include the sixth node in the evaluation graph; and
scheduling the sixth node for evaluation in parallel with the third node.

4. The method of claim 1, further comprising:
determining that both the first node and a fifth node that also is included in the first plurality of nodes are configured to access a common resource;
generating a sixth node corresponding to the fifth node;
modifying the evaluation graph to include the sixth node in the evaluation graph; and
scheduling the sixth node for evaluation serially with the third node.

5. The method of claim 1, further comprising:
determining that the first node is configured to access one or more common resources in an unpredictable manner; and
scheduling no other nodes included in the evaluation graph for evaluation in parallel with the third node.

6. The method of claim 1, further comprising:
determining that the second node is configured to request attribute information from the first node; and
forming a node cluster that includes both the third node and the fourth node.

7. The method of claim 6, further comprising scheduling the node cluster for evaluation as if the node cluster were a single node.

8. The method of claim 6, further comprising scheduling the first node and the second node for push/pull evaluation.

9. The method of claim 6, wherein the fourth node is configured to not request attribute information from the third node.

10. The method of claim 6, further comprising:
selecting a first runtime evaluation engine from a plurality of runtime evaluation engines; and
evaluating the third node and the fourth node via the first runtime evaluation engine.

11. A non-transitory computer-readable medium including instructions that, when executed by a processor, cause the processor to perform that steps of:
determining that a first node included in a first plurality of nodes depends on a first output generated by a second node that also is included in the first plurality of nodes;
generating a third node corresponding to the first node and a fourth node corresponding to the second node; and
generating an evaluation graph associated with a three-dimensional animation scene that includes the third node, the fourth node, and an indication that the third node depends on the fourth node.

12. The non-transitory computer-readable medium of claim 11, further comprising scheduling the third node for evaluation after the fourth node has been evaluated.

13. The non-transitory computer-readable medium of claim 11, further comprising:
determining that a fifth node that also is included in the first plurality of nodes does not depend on the first node;
generating a sixth node corresponding to the fifth node;
modifying the evaluation graph to include the sixth node in the evaluation graph; and
scheduling the sixth node for evaluation in parallel with the third node.

14. The non-transitory computer-readable medium of claim 11, further comprising:
determining that both the first node and a fifth node that also is included in the first plurality of nodes are configured to access a common resource;
generating a sixth node corresponding to the fifth node;
modifying the evaluation graph to include the sixth node in the evaluation graph; and
scheduling the sixth node for evaluation serially with the third node.

15. The non-transitory computer-readable medium of claim 11, further comprising:
determining that the first node is configured to access one or more common resources in an unpredictable manner; and
scheduling no other nodes included in the evaluation graph for evaluation in parallel with the third node.

16. The non-transitory computer-readable medium of claim 11, further comprising:
determining that the second node is configured to request attribute information from the first node; and
forming a node cluster that includes both the third node and the fourth node.

17. The non-transitory computer-readable medium of claim 16, further comprising scheduling the node cluster for evaluation as if the node cluster were a single node.

18. The non-transitory computer-readable medium of claim 16, further comprising scheduling the first node and the second node for push/pull evaluation.

19. The non-transitory computer-readable medium of claim 16, wherein the fourth node is configured to not request attribute information from the third node.

20. The non-transitory computer-readable medium of claim 16, further comprising:
selecting a first runtime evaluation engine from a plurality of runtime evaluation engines; and
evaluating the third node and the fourth node via the first runtime evaluation engine20.

21. A system, comprising:
a memory that includes instructions; and
a processor that is coupled to the memory and, when executing the instructions, is configured to perform the steps of:
determining that a first node included in a first plurality of nodes depends on a first output generated by a second node that also is included in the first plurality of nodes;
generating a third node corresponding to the first node and a fourth node corresponding to the second node; and generating an evaluation graph associated with a three-dimensional animation scene that includes the third node, the fourth node, and an indication that the third node depends on the fourth node.

22. The system of claim 21, wherein the processor is further configured to perform the step of scheduling the third node for evaluation after the fourth node has been evaluated.

* * * * *